United States Patent
Robein et al.

[11] Patent Number: 5,812,493
[45] Date of Patent: Sep. 22, 1998

[54] METHOD OF REPRESENTING THE TRAJECTORY OF AT LEAST ONE BOREHOLE IN A SPACE-TIME DOMAIN

[75] Inventors: Etienne Robein, Jurençon; Stefan Kaculini, Pau, both of France

[73] Assignee: Elf Aquitaine Production, Courbevoie, France

[21] Appl. No.: 793,570

[22] PCT Filed: Aug. 7, 1996

[86] PCT No.: PCT/FR96/01261

§ 371 Date: Feb. 27, 1997

§ 102(e) Date: Feb. 27, 1997

[87] PCT Pub. No.: WO97/07415

PCT Pub. Date: Feb. 27, 1997

[30] Foreign Application Priority Data

Aug. 14, 1995 [FR] France ................... 95 09797

[51] Int. Cl.⁶ .................... G01V 1/20; E21B 47/09
[52] U.S. Cl. .................... 367/25; 367/53; 367/73; 364/422
[58] Field of Search .............. 367/25, 53, 73; 364/422

[56] References Cited

U.S. PATENT DOCUMENTS

| | | |
|---|---|---|
| 4,460,059 | 7/1984 | Katz . |
| 5,229,940 | 7/1993 | Wang et al. . |
| 5,233,567 | 8/1993 | Calvert ........................... 367/27 |
| 5,680,906 | 10/1997 | Andrieux et al. ................. 367/33 |

FOREIGN PATENT DOCUMENTS

| | | |
|---|---|---|
| 789849 | 8/1997 | European Pat. Off. . |
| 2304929 | 10/1976 | France . |
| 2691811 | 12/1993 | France . |
| 2737909 | 2/1997 | France . |

OTHER PUBLICATIONS

A.G. Sena, et al., "Kirchhoff Migration and Velocity Analysis for Converted and Nonconverted Waves In Anisotropic Media", Geophysics, vol. 58, No. 2, Feb. 1993, pp. 265–276.

Godfrey et al, 10th Austr. Soc. Explor. Geophys. Conf. Feb. 24, 1994, vol. 24, #s 3–4, pp. 509–511.

Kaculini et al, 67th Annu. S&G Int. Mtg., vol. 1, pp. 587–589, Nov. 7, 1997.

Arnaud et al, 66th Ann. S&G Int. Mtg., vol. 2, pp. 1101–1104, Nov. 15, 1996.

Kaculini et al, 57th EAGE Conf., vol. 1, 2 pp, Jun. 2, 1995.

*Primary Examiner*—Nelson Moskowitz
*Attorney, Agent, or Firm*—Ostrolenk, Faber, Gerb & Soffen, LLP

[57] ABSTRACT

A method for representing in a space-time domain the trajectory of at one borehole by:

a) producing a velocity-depth model (4) tied to the borehole (1), geologically representative of said area and including a representation of said trajectory (5) of said borehole;

b) selecting at least one point (A) on or near said trajectory, said point (A) being defined by its space coordinates and by at least one dip-azimuth data pair; and c) at least modelling in a synthetic stack domain (9) the image (a) of the selected point (A), said image (a) being defined by space-time coordinates and by a dip-time vector and being obtained by zero offset ray tracing in the velocity-depth model (4).

18 Claims, 1 Drawing Sheet

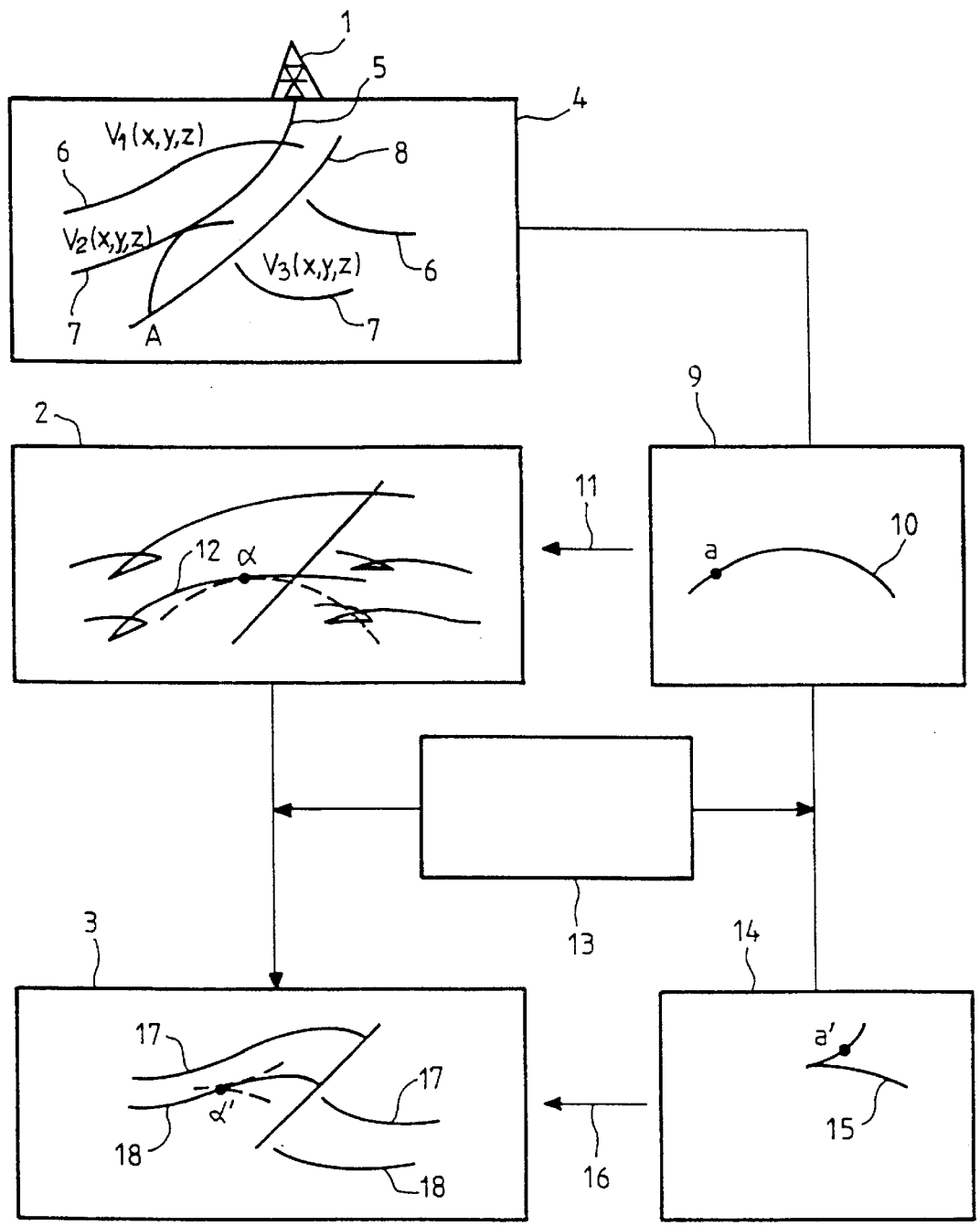

METHOD OF REPRESENTING THE TRAJECTORY OF AT LEAST ONE BOREHOLE IN A SPACE-TIME DOMAIN

The present invention concerns a method of representing the trajectory of at least one borehole in a space-time domain and more particularly a method of tying the trajectory of a side tracked borehole in a block of time-migrated seismic data.

Tying a borehole in the 2D or 3D seismic data is necessary when it is required to project onto a two-dimensional or three-dimensional seismic representation of the medium in which the borehole has been drilled all the information relating to diverse data recorded locally in or in the proximity of the borehole, usually called logs. This applies to information relating to sonic, density, resistivity, etc logs at the depth of the geological strata of said medium, at the biostrategraphic limits, at the dips of the reflectors defined in particular by the interface between two consecutive layers, at the azimuths or even at the images produced by the various borehole seismic survey techniques.

Tying is therefore effected at least a) when, in processing seismic data, the borehole(s) are used as the reference in a zero-phase deconvolution or an AVO (Amplitude Versus Offset) calibration or when the velocities in the borehole are used in combination with the stacking velocities to construct migration models, b) when the interpreter begins an interpretation to determine which seismic horizon corresponds to a given geological marker or reflector, c) when the depth representations produced in a time-depth conversion must be tied to the borehole in terms of depth and dip.

Tying can be done in the depth domain, in the interval velocity domain or in the time domain.

Tying in the depth domain requires a depth model or a series of depth maps (or representations) consistent with the depth at the position of the borehole.

Tying in the interval velocity domain is required to obtain a velocity model that comprises interval velocities consistent with the interval velocities estimated for the borehole by a calibrated sonic log or any other method. This is generally the case for the models used for migration.

When the tying is done in the time domain, the trajectory of the borehole, which is defined in terms of depth, must be represented in the time domain. It is this type of tying that raises a real problem.

When it is desired to compare a series of attributes or of values to attach to each depthwise point of the trajectory of the borehole relating, for example, to the sonic, density, electrical logs at the limits of the strata, at the dips, at the azimuths, etc, the ideal would be to represent the seismic image in depth, i.e. to perform a 3D depth migration, and to do the tying in this "natural" domain. However, this requires a precise knowledge of the velocity field of the medium. In practice, the trajectory of the borehole is projected into the migrated time domain (X, Y, T). To do this, it is assumed that the migration has displaced the information to its correct X, Y position and that the migrated time is equal to a vertical traveltime. It follows that the log in the time domain is a vertically stretched version of the depth log, the depth-time relation being derived in general from integration of the calibrated sonic log by check-shot survey or by the first arrival times of a vertical seismic profile, for example. Unfortunately, the vertical stretching and the X, Y repositioning by the time migration are approximations that are too broad or coarse when a precise result is required (for example to delineate a reservoir) or in the case of a complex or tectonic environment.

It can be seen that an essential first operation is to produce a depth propagation velocity model.

Various techniques are used or have been proposed. Among those most frequently used, that relating to time-depth vertical conversion, that using migration along the image radius (the so-called HUBRAL correction), that using migration along the normal radius, that using tomography or including inversion of the stacking velocities and that using the so-called "coherency" method may be cited.

Time-depth vertical conversion and migration along the image radius are effected from time-migrated reflectors and from information on the propagation velocity of the seismic waves obtained either from the borehole itself (check-shot survey, PSV, etc) or from surface seismic data (stacking velocities that have been inverted by application of the DIX formula).

Migration along the normal radius uses reflectors in the summation or stacking domain, said reflectors being obtained either by a plot in the summation domain or by de-migration of the time-migrated reflectors. This migration uses the same type of information on the wave propagation velocities as that mentioned above.

These methods of producing a depth representation or map have many drawbacks. In particular, the stacking velocities are in the summation-time domain whereas the horizons are in the migrated-time domain. The two series of data are not mutually consistent. Moreover, the stacking velocities include information on the interval velocity around the normal radius rather than around the vertical. Another drawback is the fact that the stacking velocities are affected by the dips of the horizons, the lateral variations of the velocities and by other factors. Some of these drawbacks can be remedied by application of DMO (DIP MOVE OUT) processing, which is applied to the common mid point (CMP) gathers before the stacking velocity analysis.

Accordingly, methods such as traveltime inversion, stacking velocity inversion, inversion by coherency or other more sophisticated techniques using depth migration before stacking may be used to produce velocity-depth models.

Methods have been developed for reducing the resulting approximations. However, in their conventional version, the model derived from the stacking velocity is an isotropic model and does not include any means for tying the borehole in migrated time. The final product obtained with these methods is a series of depth maps and velocity intervals or velocity functions [Vo(x,y)+KZ] which are obtained only from the seismic survey data.

If these maps are obtained only from surface seismic data, it is necessary to assure that the depth measured at the borehole is consistent with the depth maps. This is conventionally done by calibrating interval velocity maps using interval velocities obtained from time-depth relations measured at the location of the borehole, for example. Another method is to tie the depth maps directly.

Another disadvantage of these methods is that the anisotropy of the subsurface is treated in a very approximate manner in the determination of the velocities.

An aim of the present invention is to propose a method for tying the trajectory of a side tracked borehole in the migrated-time domain with real time enhancement of the velocity-depth model, which is the required objective.

The present invention consists in a method of representing in a space-time domain the trajectory of at least one side tracked borehole and in particular a method of tying said trajectory which includes a maximum of heterogeneities and the anisotropy of an area of the medium in which the side tracked borehole is drilled, which method is characterised in that it consists in:

a) producing a velocity-depth model tied to the borehole, geologically representative of said area and including a representation of said trajectory of said borehole;

b) selecting at least one point on or near said trajectory, said point being defined by its space coordinates and by at least one dip-azimuth data pair; and c) at least modelling in a synthetic stack domain the image of the selected point, said image being defined by space-time coordinates and by a dip-time vector and being obtained by zero offset ray tracing in the velocity-depth model.

According to another feature of the invention, the method further comprises the step of time migrating said image from the synthetic domain to obtain a representation of said image in a time-migrated domain.

According to another feature of the invention, the synthetic stack domain containing the image is superposed on a seismic data stack block.

According to another feature of the invention, the time-migrated domain containing the representation is superposed on a time-migrated seismic data block.

According to another feature of the invention, the time-migrated seismic data block is obtained from the synthetic stack block using a given migration velocity model and said image is migrated by means of said velocity model.

According to another feature of the invention, the velocity-depth model has layers delimited by reflectors.

According to another feature of the invention, the velocity-depth model is a meshed model.

According to another feature of the invention, a plurality of points are selected in the velocity-depth model and more particularly points situated at or near the intersection of the trajectory with the reflectors.

According to another feature of the invention, the time-migrated seismic data block is obtained by KIRCHHOFF migration of the stack seismic data block and the time-migrated domain is the result of analytic stacking of said KIRCHHOFF migration.

According to another feature of the invention the time migrated seismic data block is obtaining by making use of a finite difference time migration and each image in the synthetic stack domain is distributed over a surface known as the diffraction surface.

According to another feature of the invention, during application of said method, the synthetic stack domain and the recorded stack block are compared and any tangency or coincidence offset between each diffraction surface and the corresponding reflector is determined and, if there is an offset, successive iterations are applied to the velocity-depth model until said offset is acceptable whereupon it is deemed that said velocity-depth model is correctly tied.

According to another feature of the invention, the representation of the diffraction surface in migrated time is a time-migrated surface.

According to another feature of the invention, during application of said method it is determined if there is any tangency or coincidence offset between said time-migrated surface and the corresponding time-migrated horizon and, if there is an offset, successive iterations are applied to the velocity-depth model until said offset is acceptable whereupon it is deemed that said velocity-depth model is correctly tied.

According to another feature of the invention, the point of tangency or coincidence $\alpha$ or $\alpha'$, if any, is used to determine the real dip of the reflector in the velocity-depth model.

Other advantages and features of the invention will emerge from a reading of the description of one embodiment of the present invention and from the accompanying drawings in which the single FIGURE is a diagrammatic representation of a preferred implementation of the method of the invention.

The drilling of a borehole 1 enables the accumulation of a large amount of data on the subsurface area in which the borehole is drilled. Seismic data is also recorded independently in the same area and is used in particular to construct a stack block 2 referred to hereinafter as a "recorded stack block".

The recorded stack block 2 is used to produce a 'time-migrated seismic' data block 3, generally from a velocity model concerning the area in question known as the migration-time velocity field or model 13, represented using a vertical scale called the 'migrated time' scale. This model is a very coarse representation of the subsurface, which may be represented by its field of seismic wave propagation velocities $V(x,y,z)$ including the heterogeneities and the anisotropy symbolised by the field $\epsilon(x,y,z)$ that is not accurately known by the geophysicist. Any improvement in the knowledge of this information of the geological reality of the subsurface is an important gain for the exploration process. These techniques are well known to those skilled in the art and will not be described in detail.

In current exploration practice, the information collected in the borehole 1 must be compared with the recorded seismic data.

This comparison is generally done in the time-migrated seismic data domain.

Usually, starting from time-migrated seismic data and from all the information closely or distantly relevant to the propagation velocities (traveltime, stacking velocity, etc) a velocity-depth model 4 is constructed that is geologically representative of the area in question, many techniques offering greater or lesser performance, but all being approximate, being available for carrying out what is usually called the depth conversion or depth migration, depending on the technique employed.

The borehole information (position and especially dip) are known with limited accuracy, the velocities are biased by the anisotropy phenomenon and the methods of producing velocity models are insufficiently precise.

The main object of the present invention is to tie the trajectory of the borehole, represented in the velocity-depth model 4, in the time-migrated seismic block, which it has not been possible to do accurately until know because of all the hypotheses or approximations that are used in the available techniques.

Whatever technique is used to produce the velocity-depth model 4, for example vertical stretching of the time-migrated block, it is necessary to tie said velocity-depth model 4 to the borehole 1 and to associate with it the trajectory 5 of the borehole in the velocity-depth model 4. Accordingly, each point A of the trajectory 5 of the borehole is defined at least by spatial coordinates X, Y, Z and a dip vector (dip and azimuth).

The dip vector can be obtained directly from the velocity-depth model 4 if the point A is at the intersection of a reflector and the trajectory. However, this dip vector may be obtained in various ways such as dip measurement in the borehole, interpolation or extrapolation between two reflectors at known depths.

The velocity-depth model 4 is represented in the FIGURE in the form of a model with layers defined by their velocity field $V_1$, $V_2$, $V_3$, and which are delimited by reflectors of which three reflectors 6 through 8 are shown. However, it could be represented in the meshed form, a manner of representation that is well known to those skilled in the art, the meshed form being obtained from a subsurface grid and the nodes, being assigned a velocity value, are of benefit for producing the meshed network in the velocity-depth model 4.

In the velocity-depth model 4, the trajectory 5 intersects the reflectors 6 through 8, which are known as depth reflectors. Each depth reflector 6 through 8 is defined by its dip and its azimuth, among other things.

In a preferred implementation of the invention, particular attention is paid to the points of intersection between the trajectory 5 and the depth reflectors 6 through 8 and the method is described for one of these intersection points, for example the point A, although it is to be understood that the method may be applied to all other points of the trajectory and to points around each of these points of intersection, real or assumed, as will emerge below.

Each point A of the velocity-depth model 4 is modelled by zero offset ray tracing across said velocity-depth model 4; the result of this operation is an image point a which is defined by its space-time coordinates and by a dip-time pair in a synthetic domain 9 equivalent to the recorded sum block 2.

For various dip and azimuth values of the point A, zero offset ray tracing is used to construct, in the synthetic domain 9, a diffraction surface 10 on which all the images a of the point A are located, for the dip and azimuth values concerned.

In another step, the synthetic domain 9 is superposed on the recorded stack block 2, this superposition operation being shown by an arrow 11 in the FIGURE.

The result of this superposition is a possible coincidence or tangency of the diffraction surface 10, shown in dashed line in the recorded stack block 2, with the reflector 12. The point of tangency or of coincidence between the diffraction surface 10 and the reflector 12 is called the specular point α. As there is a one-to-one relationship between the specular point α and the dip corresponding to the point A, this dip represents new information on the real dip of the reflector at the point A.

It is also possible to complete the diffraction surface 10 to allow for the uncertainty as to the measured spatial trajectory of the borehole, for example, taking several points or a cloud of points around and near the selected point of intersection A, and using zero offset ray tracing at each of these points in order to specify better the position of the specular point α.

The same operation is repeated for each of the points of intersection or points near the intersection of the trajectory 5 with the depth reflectors 6 through 8, etc of the model 4, each of the points of intersection A being obviously identified by its coordinates $X_a$, $Y_a$, $Z_a$. If the point A is not part of a depth reflector, points to either side of the trajectory 5 and around the point A are taken and the parameters at the point A are determined by interpolation, after which an operation to determine its image a in the synthetic domain 9 is carried out.

At this stage it is possible to visually verify (and correct if necessary) the velocity-depth model 4, interactively or in real time during application of the method.

It becomes possible, at the workstation, to compare the synthetic stack domain 9 and the recorded stack block 2 to determine if there is a tangency or coincidence offset between each diffraction surface 10 and the corresponding reflector 12 of the recorded stack block. When there is any such offset, successive iteration is applied to the velocity-depth model 4, by changing the values of the dip-azimuth vector and/or the values of the velocities of the velocity-depth model and/or the parameters characterising the anisotropy of the borehole area, until such offset is acceptable, whereupon said velocity-depth model 4 is deemed to be correctly tied. In this way it is possible to refine the velocity-depth model 4 as the method of the invention is applied and to tie the trajectory 5 of the borehole in said model more accurately.

This also makes it possible to verify if the dip interval used is correct for the point A selected.

In a subsequent step, time migration is effected for each of the points of each diffraction surface 10 of the synthetic sum domain 9, for example, by simulation, allowing for the dip-time pair corresponding to each of said points, which simulation is effected via the migrated-time velocity field 13. At least two different methods can be used to carry out this simulation.

One of these methods is that using anisotropic ray tracing in the time migration velocity model (B. RAYNAUD 1993: Real time migration operators simulated by anisotropic ray tracing. 55th EAEG-CO45), step by step, to simulate the time migration operation by finite differences or by any other method making comparable allowance for the time migration velocity model.

Another method is to simulate the KIRCHHOFF time migration by an analytic approach. This method consists in migrating a point of the diffraction surface assumed to be a hyperboloid to the apex of said hyperboloid.

In these methods of simulating the kinematics of time-migration, a velocity law may advantageously be used that allows for velocity variations included in the time-migration velocity model of the area in question.

The result of the simulation in a time-migration domain 14 of each of the diffraction surfaces 10 is not a single point but a time-migrated surface 15 called a "plume".

As has been described for the stacking field domain, the domain 14 may also be superposed on the migrated-time block 3 in the migrated time domain, this superposition operation being shown by an arrow 16 in the FIGURE.

The result of the superposition is possibly coincidence or tangency of the plume 15 shown in dashed line in the time-migrated block 3 which includes time-migrated seismic horizons 17, 18. The image of the point a is at a' in the domain 14 and that of the specular point is at α' in the block 3.

At this stage, it is still possible to visually verify (and if necessary correct) the velocity-depth model 4 interactively or in real time during application of the method. Each time-migrated plume 15 can be compared with a seismic horizon 18 to determine if there is any tangency or coincidence offset between said plume and said seismic horizon. If there is any such offset, successive iterations are applied to the velocity-depth model 4, by changing the values of the dip-azimuth vector and/or the velocity values of the velocity-depth model and/or the parameters characterising the anisotropy of the borehole area, until said offset is acceptable whereupon said velocity-depth model 4 is deemed to be correctly tied.

Thus the present invention enables correction of defects at substantially any stage of the method, working back to the causes of said defects and remedying their causes very quickly, by one-off action, the final result being excellent and precise tying of the trajectory 5 in the time-migrated block and improvement of the migration model before and after stacking of the seismic, imaging, time-depth, etc data and of the velocity-depth model 4, so that this model becomes usable for other purposes.

If the knowledge of the velocity field 13 is imperfect, it is possible in accordance with the invention to improve it. From a plot in the time-migrated block 3, for example of the horizons 17, 18, corresponding reflectors are created that can be converted into stack reflectors by de-migration processes that are the exact converse of the time-migration simulations. These de-migrated reflectors are then superposed on the seismic data or reflectors of the block 2. Any offset is noted and can be used to improve the velocity field 13.

Another feature of the present invention is that it enables inverse implementation of the method. For a point of tangency between a plume 15 and the corresponding horizon in the time-migrated block it is possible to determine the dip-time pair associated with it. The diffraction surface 10 corresponding to said plume 15 and its specular point α in the stacking block 2 are then marked in the synthetic stack domain 9. Because the specular point α corresponds to a single point of the velocity-depth model 4, it becomes possible to determine the position of this point and the associated dip-azimuth vector.

By virtue of the present invention, the corresponding positions α of the stacking block 2 and α' in the time-migrated block 3 are obtained for a chosen depth model 4, for a particular point A of the trajectory 5 and for a selected dip-vector.

If there is any ambiguity or uncertainty as to the dip, the point A is projected onto another surface a" (not shown) characteristic of that ambiguity.

Superposition in the stacking or time-migration domain may allow this ambiguity to be resolved, but not necessarily. In the latter case the result of the method is not a single trajectory, but a possible "trajectory-area".

One advantage of the present invention that follows from the foregoing description is that it is possible to return constantly to the velocity-depth model 4 either from a point or an area of the diffraction surface 10 or from a point or a part of the plume 15.

It is also easy to understand that a point of tangency or coincidence on the blocks 2 and/or 3 enables direct return to the velocity-depth model 4 without any intermediate step and deduction therefrom of very accurate information that is very useful to those skilled in the art.

We claim:

1. Method for representing in a space-time domain the trajectory (5) of at least one borehole (1) drilled in a sub-surface area, characterised in that it consists in
   a) producing a velocity-depth model (4) tied to the borehole (1), geologically representative of said area and including a representation of said trajectory (5) of said borehole;
   b) selecting at least one point (A) on or near said trajectory, said point (A) being defined by its space coordinates and by at least one dip-azimuth data pair; and
   c) at least modelling in a synthetic stack domain (9) the image (a) of the selected point (A), said image (a) being defined by space-time coordinates and by a dip-time vector and being obtained by zero offset ray tracing in the velocity-depth model (4).

2. Method according to claim 1 characterised in that it further comprises the step of time migrating said image (a) from the synthetic domain (9) to obtain a representation (a') of said image (a) in a time-migrated domain (14).

3. Method according to claim 1 characterised in that the synthetic stack domain (9) containing the image (a) is superposed on a seismic data stack block (2).

4. Method according to claim 2 characterised in that the time-migrated domain 14 containing the representation (a') is superposed on a time-migrated seismic data block (3).

5. Method according to claim 4 characterised in that the time-migrated seismic data block is obtained from the recorded stack block (2) using a given migration velocity model (13) and in that said image (a) is migrated by means of said velocity model (13).

6. Method according to claim 1 characterised in that the velocity-depth model (4) has layers delimited by reflectors (6 through 8).

7. Method according to claim 1 characterised in that the velocity-depth model (4) is a meshed model.

8. Method according to claim 1 characterised in that a plurality of points (A) are selected in the velocity-depth model (4) and more particularly points situated at or near the intersection of the trajectory (5) with the reflectors (6 through 8).

9. Method according to claim 1 characterised in that the time-migrated seismic data block (3) is obtained by KIRCHHOFF migration of the stack seismic data block (2) and in that the time-migrated domain (14) is the result of analytic stacking of said KIRCHHOFF migration.

10. Method according to claim 1 characterised in that the time-migrated seismic data block (3) is obtained by means of a finite differences migration and in that the time-migrated domain results from an operation of step by step anisotropic ray tracing in the velocity domain (13).

11. Method according to claim 1 characterised in that each image (a) in the synthetic sum domain (9) is distributed over a surface known as the diffraction surface (10).

12. Method according to claim 11 characterised in that a part of the diffraction surface (10) is selected as being the image in the synthetic stack domain (9) of the point (A) selected in the velocity-depth model (4).

13. Method according to claim 1 characterised in that, during application of said method, the synthetic stack domain (9) and the recorded stack block (2) are compared and any tangency or coincidence offset between each diffraction surface (10) and the corresponding reflector (12) is determined and, if there is an offset, successive iterations are applied to the velocity-depth model (4) until said offset is acceptable whereupon it is deemed that said velocity-depth model (4) is correctly tied.

14. Method according to claim 11 characterised in that the representation of the diffraction surface (10) in migrated time is a time-migrated surface (15).

15. Method according to claim 14 characterised in that a part of the time-migrated surface (15) is selected as being the image in the time-migrated domain (14) of the point (A) selected in the velocity-depth model (4).

16. Method according to claim 14 characterised in that during application of said method any tangency or coincidence offset between said time-migrated surface (15) and the corresponding time-migrated horizon (18) is determined and, if there is an offset, successive iterations are applied to the velocity-depth model (4) until said offset is acceptable whereupon it is deemed that said velocity-depth model (4) is correctly tied.

17. Method according to claim 13 characterised in that the point of tangency α or α', if any, is used to determine the real dip of the reflector in the velocity-depth model (4).

18. Method according to claim 16 characterized in that the point of tangency α or α', if any, is used to determine the real dip of the reflector in the velocity-depth model.

* * * * *